United States Patent [19]

Strack

[11] 4,339,418
[45] * Jul. 13, 1982

[54] PROCESS FOR THE PRODUCTION OF ZEOLITE A

[75] Inventor: Hans Strack, Alzenau, Fed. Rep. of Germany

[73] Assignees: Degussa AG, Frankfurt; Henkel Kommanditgessel, Duesseldorf, both of Fed. Rep. of Germany

[ * ] Notice: The portion of the term of this patent subsequent to Jul. 13, 1999, has been disclaimed.

[21] Appl. No.: 237,727

[22] Filed: Feb. 24, 1981

[30] Foreign Application Priority Data

Feb. 26, 1980 [DE] Fed. Rep. of Germany ....... 3007123

[51] Int. Cl.$^3$ ............................................. C01B 33/28
[52] U.S. Cl. ..................................... 423/329; 423/328
[58] Field of Search ................................ 423/328–330; 252/455 Z; 106/288 B

[56] References Cited

U.S. PATENT DOCUMENTS

| | | | |
|---|---|---|---|
| 4,041,135 | 8/1977 | Williams et al. | 423/328 |
| 4,071,377 | 1/1978 | Schwuger et al. | 423/329 |
| 4,073,867 | 2/1978 | Roebke et al. | 423/329 |
| 4,248,847 | 2/1981 | Derleth et al. | 423/329 |
| 4,303,626 | 12/1981 | Strack et al. | 423/329 |
| 4,303,627 | 12/1981 | Strack et al. | 423/329 |
| 4,303,628 | 12/1981 | Strack et al. | 423/329 |
| 4,305,916 | 12/1981 | Strack et al. | 423/329 |

FOREIGN PATENT DOCUMENTS 2651437  5/1978  Fed. Rep. of Germany ...... 423/328

*Primary Examiner*—Edward J. Meros
*Attorney, Agent, or Firm*—Cushman, Darby & Cushman

[57] ABSTRACT

There is produced crystalline zeolite powder of Type A having an average particle diameter of 7 to 8.5$\mu$ by introducing the components waterglass and alkali aluminate liquor under defined conditions simultaneously into a receiver containing water, stirring, subsequently first adding more alkali aluminate liquor and then more waterglass solution. The thus obtained crystalline zeolite powder is used as a phosphate substitute in washing agents.

8 Claims, No Drawings

PROCESS FOR THE PRODUCTION OF ZEOLITE A

BACKGROUND OF THE INVENTION

The invention is directed to a process for the production of crystalline zeolite powder of Type A.

Zeolite A is a crystalline alkali aluminum silicate and corresponds in its composition to the formula $$1.0\pm0.2 M_{2/n}O:Al_2O_3:1.85\pm0.5 SiO_2 \cdot yH_2O$$

where M is a metal cation, n its valence and y has a value up to 6.

Zeolite A in an increasing measure is important as a substitute for phosphate in washing agents. For this purpose it is desirable that the crystalline zeolite powder of Type A have the most uniform particle size possible, i.e. as narrow as possible particle size distribution curve.

SUMMARY OF THE INVENTION

The object of the invention is the development of a process for the production of crystalline zeolite powder of Type A having an average particle diameter of 7 to 8.5μ which is characterized by simultaneously adding to a receiver containing 8 to 12 parts by volume of water during a time span of 5 to 15 minutes with stirring at a temperature of 30° to 70° C. 1.5 to 2.5 parts by volume of sodium aluminate liquor having a concentration of 50 to 200, preferably 90 to 150 g/l of Na$_2$O and 30 to 150, preferably 60 to 100 g/l of Al$_2$O$_3$ as well as 0.6 to 2.5 parts by volume of a waterglass solution having a concentration of 90 to 120, preferably 100 to 120 g/l of Na$_2$O and 330 to 380, preferably 340 to 370 g/l of SiO$_2$, which in a given case can be diluted with 2.3 to 2.4 parts by volume of water, stirring the reaction mixture for 15 to 45 minutes at a temperature of 30° to 70° C., subsequently adding with stirring at a temperature of 30° to 70° C. during a time span of 100 to 140 minutes 15 to 20 parts by volume of a sodium aluminate liquor of the same concentration, in a given case stirring for a further 25 to 35 minutes, subsequently adding a further 1.0 to 3.5 parts by volume of a waterglass solution of the same concentration under stirring in a time span of 15 to 30 minutes, at a temperature of 30° to 70° C., subsequently stirring the reaction mixture in a given case at a temperature of 70° to 100° C. over a time span of 20 to 180 minutes, the reaction mixture is then cooled, the crystalline reaction product filtered off, washed with water up to a pH of below 10.5 and subsequently drying, whereby the filtrate and the wash water in a given case is processed to the form of the sodium aluminate liquor and is returned into the reaction process.

The crystalline zeolite powder of Type A produced according to the process of the invention has an average particle diameter of 7 to 8.5μ. It has a very small grit content, in the examples not over 0.114 weight % of particles >45μ. It can be employed advantageously as a phosphate substitute in washing agents.

The process can comprise, consist essentially of or consist of the steps set forth with the stated materials.

The process of the invention is explained in detail in the following examples.

DETAILED DESCRIPTION

EXAMPLE 1

There were present in a reaction vessel 10 liters of water. Then there were simultaneously added to the container with stirring during a time span of 10 minutes at a temperature of 60° C. 2 liters of sodium aluminate liquor having a concentration of 142 g/l of Na$_2$O and 85 g/l of Al$_2$O$_3$ and 2.5 liters of waterglass having a concentration of 104 g/l of Na$_2$O and 356 g/l of SiO$_2$. The reaction mixture was stirred subsequently for 30 minutes. Subsequently there were added a further 18 liters of sodium aluminate liquor of the same concentration during 2 hours at a temperature of 60° C. with stirring. Then a further 1.1 liters of waterglass solution of the same concentration was added with stirring at a temperature of 60° C. during a time span of 10 minutes. Subsequently, the mixture was further stirred for 120 minutes at a temperature of 82° C., filtered, washed, and dried.

The reaction product is pure zeolite A having the following particle size distribution (measured with a Coulter Counter):

50 wt.-% <7μ
12 wt.-% <10μ
3 wt.-% <15μ

The grit content (particles >45μ) according to Mocker was 0.092 weight % and the calcium binding capacity was 163 mg CaO/g of zeolite. The mother liquor was used for the preparation of fresh sodium aluminate solution.

Example 2

There were present in a reaction vessel 10 liters of water. Then there were simultaneously added with stirring and at a temperature of 34° C. during a time span of 10 minutes 2 liters of sodium aluminate liquor having a concentration of 144 g/l of Na$_2$O and 81 g/l of Al$_2$O$_3$ and 0.6 liters of waterglass solution having a concentration of 108 g/l of Na$_2$O and 360 g/l of SiO$_2$ which was diluted with 1.4 liters of water. Subsequently the reaction mixture was stirred for 30 minutes. Then there were added with stirring during 10 minutes at a temperature of 34° C. a further 18 liters of sodium aluminate liquor of the same concentration. Next the reaction mixture was stirred for 30 minutes. A further 3 liters of waterglass solution of the same concentration was then added under stirring at a temperature of 34° C. during a time span of 10 minutes.

Subsequently stirring was continued for 30 minutes at a temperature of 98° C. followed by filtering, washing, and drying.

The reaction product is a pure zeolite A having the following particle size distribution (measured with the Coulter Counter):

50 wt.-% <8.5μ
19 wt.-% <10μ
4 wt.-% <15μ

The grit content (particles >45μ) according to Mocker is 0.114 wt. % and the calcium binding capacity 166 mg CaO/g of zeolite.

The entire disclosure of German priority application P 3007123.9 is hereby incorporated by reference.

What is claimed is:

1. A process for the production of a crystalline zeolite powder of Type A having an average particle diameter of 7 to 8.5μ comprising (1) having present in a container 8 to 12 parts by volume of water, (2) simultaneously adding with stirring during a time span of 5 to 15 minutes at a temperature of 30° to 70° C. either (a) 1.5 to 2.5 parts by volume of sodium aluminate liquor having a concentration of 50 to 200 g/l of Na$_2$O and 30 to 150 g/l of Al$_2$O$_3$ and 0.6 to 2.5 parts by volume of a waterglass solution having a concentration of 90 to 120 g/l of Na$_2$O and 330 to 380 g/l of SiO$_2$ or (b) a sodium aluminate liquor and waterglass solution as set forth in (a) wherein the waterglass solution is diluted with water in an amount up to 2.4 times its volume, (3) stirring the reaction mixture for 15 to 45 minutes at a temperature of 30° to 70° C., subsequently adding with stirring during a time span of 100 to 140 minutes at a temperature of 30° to 70° C., a further 15 to 20 parts by volume of a sodium aluminate liquor of the same concentration as in step (2), (5) subsequently with stirring at a temperature of 30° to 70° C. during a time span of 15 to 30 minutes adding a further 1.0 to 3.5 parts by volume of waterglass solution of the same concentration as in step (2), (6) subsequently stirring the reaction mixture over a time span of 20 to 180 minutes at 70° to 100° C., cooling the reaction mixture, filtering off the crystalline reaction product, washing with water to a pH below 10.5 and subsequently drying.

2. The process of claim 1 including the steps of stirring for 25 to 35 minutes at 30° 70° C. between steps (4) and (5).

3. The process of claim 1 wherein in step (2) there is employed the waterglass solution diluted with 2.3 to 2.4 times its volume of water.

4. The process of claim 1 wherein the concentration of the sodium aluminate liquor added in step (2) is 90 to 150 g/l of Na$_2$O and 60 to 100 g/l of Al$_2$O$_3$ and the concentration of the waterglass solution in step (2) is 100 to 120 g/l of Na$_2$O and 340 to 370 g/l of SiO$_2$ or such waterglass solution diluted with 2.3 to 2.4 times its volume of water.

5. The process according to claim 1 wherein there is originally present in the container 10 liters of water, step (2) is carried out during 10 minutes at a temperature of 60° C. using 2 liters of sodium aluminate liquor having a concentration of 142 g/l of Na$_2$O and 85 g/l of Al$_2$O$_3$ and 2.5 liters of waterglass having a concentration of 104 g/l of Na$_2$O and 356 g/l of SiO$_2$, stirring in step (3) is for 30 minutes, in step (4) there is added 18 liters of sodium aluminate liquor during 2 hours at a temperature of 60° C., stirring in step (5) is for 10 minutes at a temperature of 60° C. using 1.1 liters of waterglass solution and in step (6) stirring is for 120 minutes at a temperature of 82° C.

6. The process according to claim 1 wherein there is originally present in the container 10 liters of water, step (2) is carried out during 10 minutes at a temperature of 34° C. using 2 liters of sodium aluminate liquor having a concentration 144 g/l of Na$_2$O and 81 g/l of Al$_2$O$_3$ and 0.6 liters of waterglass solution having a concentration of 108 g/l of Na$_2$O and 360 g/l of SiO$_2$ which is diluted with 1.4 liters of water, stirring in step (3) is for 30 minutes, in step (4) there is added 18 liters of the sodium aluminate liquor, the reaction mixture is then stirred for 30 minutes in step, (5) there is added 3 liters of waterglass solution during 10 minutes at 34° C. and in step (6) stirring is for 30 minutes at 98° C.

7. The process according to claim 1 wherein the filtrate is employed as a source of sodium aluminate liquor and returned into the a reaction process.

8. The process of claim 1 wherein the filtrate and the wash water are employed as a source of sodium aluminate liquor and returned into the reaction process.

* * * * *